June 28, 1966  J. J. FRY  3,257,866
ACTUATING MECHANISMS, MORE PARTICULARLY FOR VALVES
Filed June 26, 1964  4 Sheets-Sheet 1
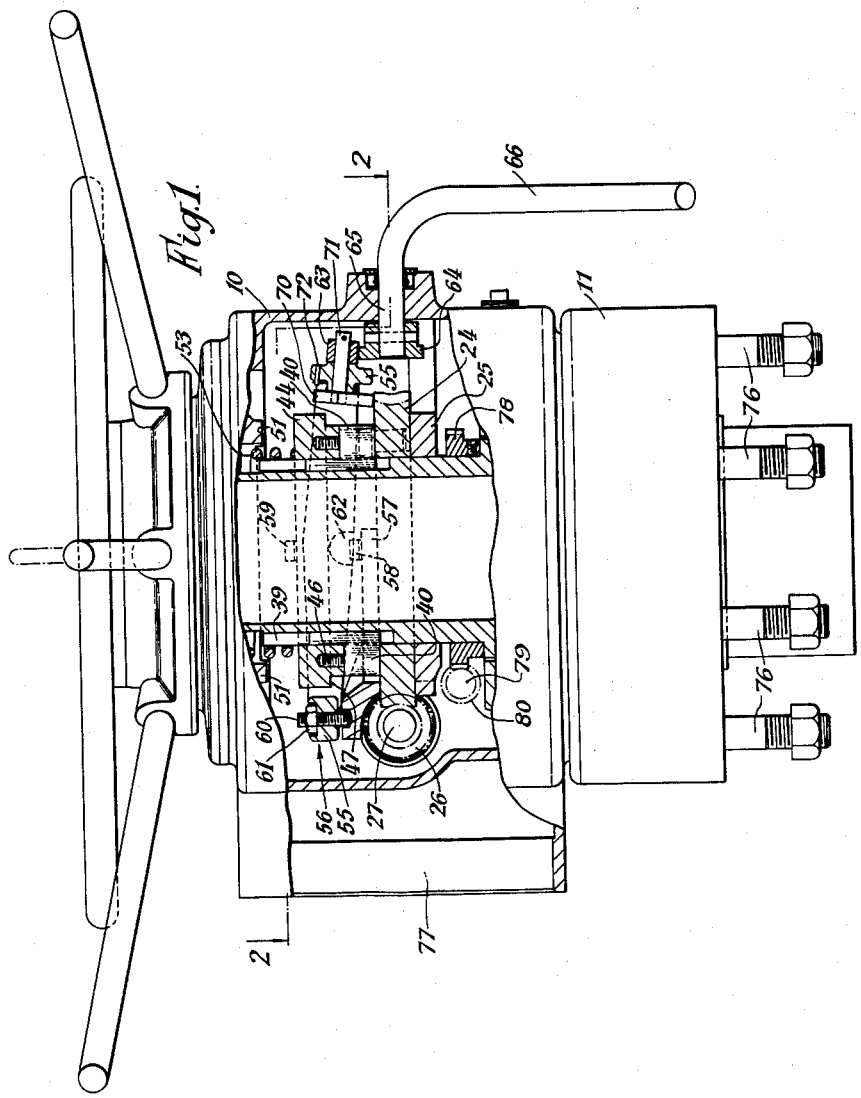
INVENTOR.
Jeremy J. Fry
BY
Stevens, Davis, Miller + Mosher, ATTORNEYS

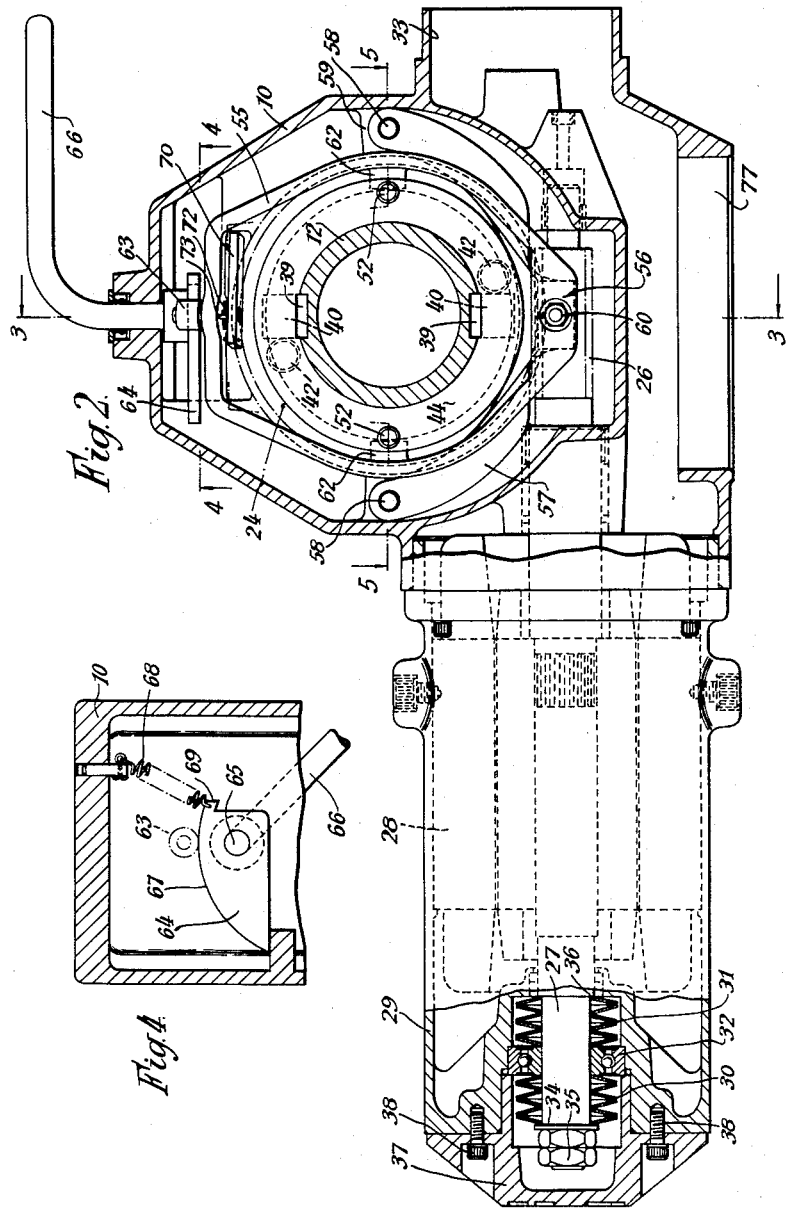

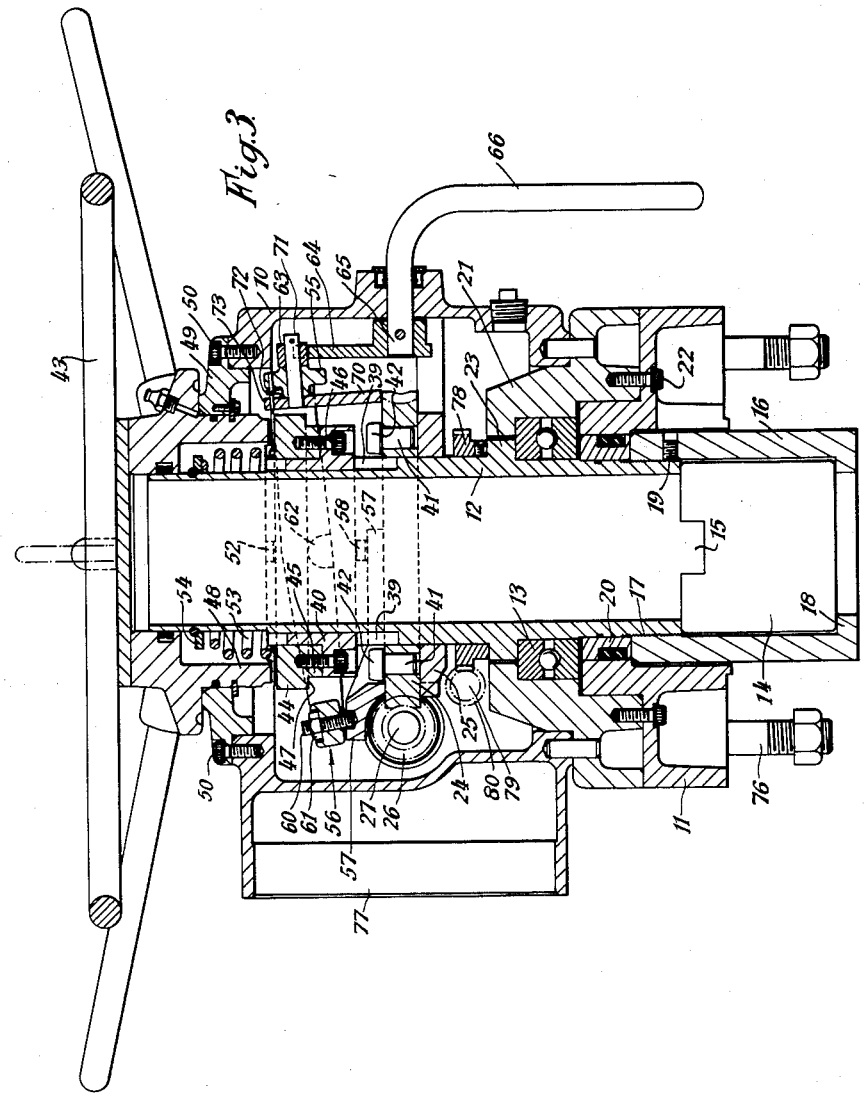

June 28, 1966  J. J. FRY  3,257,866
ACTUATING MECHANISMS, MORE PARTICULARLY FOR VALVES
Filed June 26, 1964  4 Sheets-Sheet 4

INVENTOR.
Jeremy J. Fry
BY
Stevens, Davis, Miller & Mosher ATTORNEYS

United States Patent Office 3,257,866
Patented June 28, 1966

3,257,866
ACTUATING MECHANISMS, MORE PARTICULARLY FOR VALVES
Jeremy J. Fry, Bath, England, assignor to Rotork Engineering Company Limited, Somerset, England
Filed June 26, 1964, Ser. No. 378,356
Claims priority, application Great Britain, June 27, 1963, 25,647/63
10 Claims. (Cl. 74—625)

This invention relates to actuating mechanisms and more particularly to a valve actuating mechanism of the kind incorporating a drive mechanism by which the valve may be selectively operated either manually i.e. by rotation of the customary handwheel or by power means such as an electric motor.

In known arrangements of such valve actuating mechanisms a clutch member is provided which is movable axially by a hand lever in one direction to couple the output shaft or valve spindle to a handwheel for manual operation. The clutch member is automatically moved in the opposite direction to reset the actuator for power operation upon energisation of the electric motor which causes the disengagement of retaining means normally holding the clutch member in driving engagement with the handwheel.

The principal object of the present invention is to provide a modified drive mechanism of the kind set out above and which is intended primarily for larger sized actuators having a high torque output. A further object of the invention is to provide an improved drive mechanism which is particularly robust in construction and which includes a clutch mounting which is fully adjustable after assembly within the actuator.

In its broadest aspect the invention provides an actuator, such as a valve actuator, comprising an output shaft or spindle for actuating the valve, a worm wheel mounted on said output shaft or spindle and freely rotatable relatively thereto in response to energisation of a power means such as an electric motor, clutch means mounted on said output shaft or spindle for rotation therewith but movable axially relatively thereto, resilient means normally urging said clutch means into a first axial position in which said worm wheel drivably engages said clutch means, means for moving said clutch means axially against said resilient means into a second axial position on said output shaft or spindle, manual means for drivably engaging said clutch means to rotate said clutch means in said second axial position, and retaining means operable to engage said worm wheel in said second axial position of said clutch means and to hold said clutch means in driving engagement with said manual means, the arrangement being such that subsequent energisation of said power means rotates said worm wheel to disengage said retaining means therefrom whereby said clutch means is moved from its second axial position to its first axial position by said resilient means for drivably re-engaging said worm wheel.

In the preferred embodiment of the invention the output shaft or spindle is formed with a pair of diametrally positioned slots in its outer surface and which extend axially of the shaft or spindle to slidably receive a pair of blocks or like members forming said clutch means. The blocks or like member engage the worm wheel in the first axial position of the clutch means and the worm wheel is formed with a pair of upstanding projections or lugs which drivably engage the side faces of the blocks or like members upon rotation of the worm wheel by the power means.

An annular ring is conveniently secured to the blocks or like members for movement therewith and the ring is adapted to drivably engage the manual means in the second axial position of the clutch means. The movement of the clutch means axially to its second position is conveniently obtained by means of a yoke member which is mounted around the output shaft or spindle and which engages beneath the annular ring. The yoke member is pivotally mounted at one side of the output shaft or spindle for pivotal movement by a manually operable cam member positioned at the other side of the output shaft or spindle. The pivotal mounting of the yoke member in the actuator is preferably adjustable and the yoke member is formed with a pair of inwardly directed pair of projections or lugs which engage beneath the annular ring of the clutch means.

The retaining means preferably comprises a pawl which is pivotally mounted on the yoke member and is urged by resilient means to a vertical position so that the end of the pawl will engage with the upper surface of the worm wheel in the second axial position of the clutch means so as to hold the clutch means in its manually operable position as obtained by the pivotal movement of the yoke member by the manually operable cam member.

In order that the invention may be clearly understood the preferred embodiment will now be described by way of example with reference to the accompanying drawings, in which:

FIGURE 1 is a side elevation of a valve actuator which is partly broken away in order to show the details of the invention. In this view the clutch means are in their first axial position on the output shaft so that the shaft is power driven;

FIGURE 2 is a sectional plan taken on the line 2—2 of FIGURE 1;

FIGURE 3 is a sectional view taken on the line 3—3 of FIGURE 2. In this view the clutch means are shown in their second axial position on the output shaft so that the shaft is manually operable by the handwheel;

FIGURE 4 is a sectional view on the line 4—4 of FIGURE 2 showing details of the manually operable cam member for pivotally moving the yoke member;

Figure 5:
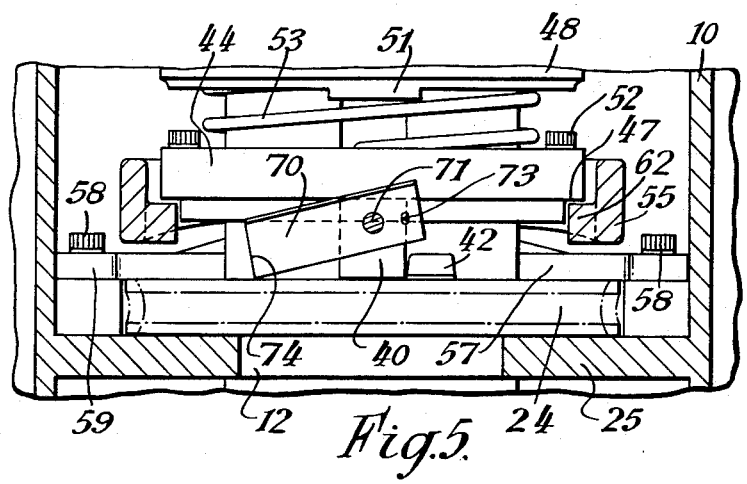
Figure 6:
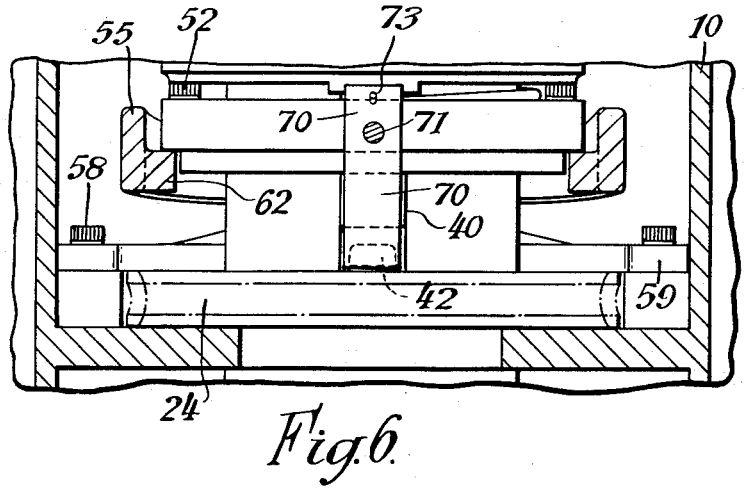

FIGURE 5 is a fragmentary sectional view on the line 5—5 of FIGURE 2 with the retaining means in its inoperative position as when the clutch means is positioned for power operation as shown in FIGURE 1; and FIGURE 6 is a similar fragmentary sectional view as FIGURE 5 but showing the retaining means in its operative position engaging the surface of the worm wheel so as to maintain the clutch means in its manually operable position.

Referring now to the drawings and in particular to FIGURES 1 to 3, it will be seen that the actuator comprises a main outer casing 10 which may be positioned horizontally or vertically, but for the purpose of the following description is positioned substantially vertically. The lower part of the casing 10 is provided with a closure plate 11 which has an outlet therein for the lower end of the main hollow output shaft or spindle 12 which extends vertically in the main casing as shown in FIGURES 1 and 3. The output shaft 12 is rotatably mounted in the casing 10 by means of suitable bearings, a lower bearing being shown at 13. The bearing 13 is a thrust bearing capable of receiving thrust in response to movement of the output shaft in either direction. As shown the lower end of the output shaft drivably engages a rotatable nut 14 by means of keyed connections 15 so that the nut is connected to the shaft for rotation therewith. The nut 14 is mounted within the outer sleeve 16 which is internally screw threaded at 17 and mounted on the lower end of the output shaft 12 which projects through the closure plate 11. The sleeve 16 is rotatable with the output shaft 11 and the nut 14. The lower end of the sleeve 16 is formed with an inwardly directed flange 18 which holds the nut 14 in driving engagement with the shaft 12, the assembly being completed by a locking screw 19. A rising valve spindle (not shown) is externally screw-threaded at its upper end and is mounted in the nut member so that rotation of the nut member by the output shaft 12 will produce axial movement of the valve spindle in one or other direction depending upon the direction of rotation of the nut member 14. Upward thrust due to rotation of the valve spindle in one direction is transmitted through the sleeve 16 to the collar 20 and then to the thrust bearing 13. The thrust bearing 13 seats on the casing member 21 to which the closure plate 11 is attached by bolts 22. The downward thrust due to movement of the valve spindle in the other direction is transmitted to the thrust bearing 13 through the annular flange 23 on the output shaft 12, the thrust being taken by the extension of the closure plate surrounding the collar 20. It is to be noted also that the positioning of the nut member 14 externally of the actuator casing 10 permits among other advantages the provision of an increased spindle capacity for a given size of actuator.

A worm wheel 24 is mounted around the output shaft or spindle 12 within the main actuator casing 10 and is freely rotatable relatively thereto. The worm wheel is supported on a bearing plate 25 and it will be understood that there is no driving connection whatsoever between the worm wheel 24 and the output shaft 12. The worm wheel 24 is at all times in driving engagement with a worm 26 which is mounted on the main driving shaft 27 of the actuator, which driving shaft is rotatable in one or other direction by means of a reversible electric motor shown generally by the reference numeral 28 and which is located in the horizontally positioned casing 29 extending from the main casing 10 of the actuator. As shown in FIGURE 2 of the drawings the main driving shaft 27 is provided at its outer end with two packs of Belleville washers shown by the reference numerals 30 and 31. The packs of Belleville washers are mounted on each side of a fixed bearing 32 mounted in the casing 29 and the arrangement is such that the washers permit axial movement of the driving shaft 27 in either direction in response to a predetermined torque due to resistance to movement of the valve. This axial movement of the shaft 27 is normally utilised to operate torque switches in a control unit (not shown) for operating the electrical circuits of the reversible electric motor 28. Such a control unit would be attached to the outlet portion 33 of the actuator casing. As shown in FIGURE 2 of the drawings the lefthand end of the driving shaft 27 is provided with a washer 34 secured thereto by lock nuts 35 so that movement of the driving shaft 27 to the right as seen in FIGURE 2 produces compression of the pack of Belleville washers 30 against the fixed bearing 32. In the other leftward direction of movement of the driving shaft 27 a shoulder 36 formed on the driving shaft compresses the pack of Belleville washers 31 against the righthand side of the fixed bearing 32. The casing 29 is completed by a closure plate 37 which is secured thereto by connecting bolts 38.

The output shaft 12 is formed with a pair of diametrally positioned slots 39 which extend axially in the shaft to a position just below the upper surface of the worm wheel 24. Each of the slots 39 slidably receives a driving member in the form of an L-shaped block 40 so that the driving blocks 40 are at all times rotatable with the output shaft 12 but are capable of axial movement thereto in the slots 39 formed in the outer surface of the shaft 12. The upper surface of the worm wheel 24 is provided with a pair of upstanding studs 41 which are formed with enlarged heads 42 which upon rotation of the worm wheel 24 will engage one or the other of the side faces of the driving blocks 40 positioned in the slots 39 of the output shaft 12, when the driving blocks are in their lowermost positions in the slots. The arrangement is shown particularly in FIGURE 5 of the drawings and it will be seen that the head 42 of one of the studs 41 has just engaged the righthand side face of a block 40 so as to rotate the block and therefore the output shaft in a clockwise direction. It will be appreciated that as the worm wheel 24 initially rotates the studs 41 will produce a hammer blow on the side faces of the driving blocks 40 and this will frequently assist in moving a stuck valve.

The axially movable driving blocks 40 form part of a clutch means for transferring the drive from the electric motor 28 to a manual device such as the hand wheel 43 which is mounted on the top of the actuator casing 10. To this end the driving blocks support an annular ring 44 which seats on the outwardly directed portion 45 of the L-shaped blocks 40 and is attached thereto by bolts 46. The annular ring 44 has a flanged portion which provides a lower surface 47 which is engageable as will be hereinafter described for lifting the ring member 44 and thereby the driving blocks 40 axially upwardly relative to the output shaft 12 and into driving engagement with the flange 48 of the hand wheel 43. The flange 48 of the hand wheel is rotatably mounted within the upper closure plate 49 of the actuator casing 10 to which it is secured by the bolts 50. The lower end of the annular flange 48 of the hand wheel is formed with a pair of diametrally positioned axially extending projections or dogs 51 which are shown more clearly on FIGURE 1 of the drawings. Furthermore the upper surface of the annular ring 44 is provided with a pair of diametrally positioned studs 52 which project from the upper surface of the annular ring 44 so that when the ring is in its uppermost position, as shown in FIGURE 3 of the drawings, the driving dogs 51 on the flange 48 on the hand wheel will mechanically engage with the side surfaces of the studs 52 so as to rotate the output shaft 12 in one direction or the other in accordance with the rotation of the hand wheel 43. As before the usual hammer blow will be obtained so as to assist in freeing a stuck valve.

Under normal operating conditions the driving blocks 40 together with the annular ring 44 will be maintained in their lowermost position as shown in FIGURE 1 of the drawings so that the output shaft 12 will be rotated by means of the worm wheel 24 upon energisation of the electric motor 28. The driving blocks 40 are maintained in their lowermost position by means of a relatively heavy spring 53 which is retained in position at its upper end by an annular plate 54 which is retained by means of a rubber O-ring engaging a suitable annular groove or slot in the outer surface of the output shaft 12. The lower end of the spring 53 engages directly on the upper surface of the annular ring 44 to urge the ring and the driving blocks 40 downwardly in the slots 39.

The clutch means, i.e. the driving blocks 40 and the annular ring 44, are raised to their uppermost position as shown in FIGURE 3 of the drawings by means of a yoke member 55 which is substantially annular in shape as shown in FIGURE 2 of the drawings and is mounted around the output shaft 12. The yoke member 55 is pivotally mounted at 56 at one end on a fixed part 57 of the actuator casing. As shown in FIGURE 2 of the drawings the part 57 comprises a semi-circular member which is attached at its ends by bolts 58 to inwardly extending portions 59 of the main actuator casing 10. The pivotal mounting 56 of the yoke member 55 comprises an adjustable screw 60 mounted in the nut 61 so that the position of the yoke member 55 can be adjusted relative to the support 57.

The yoke member 55 is provided with a pair of diametrally positioned lugs or projections 62 which project inwardly from the yoke member and engage beneath the lower surface 47 of the annular ring member 44 of the clutch means as shown more clearly in FIGURES 5 and 6 of the drawings. At the opposite side of the yoke member 55 to the pivotal mounting 56 there is provided a thrust member 63 which is engageable by a cam plate 64 mounted on a shaft 65 extending through the side of the actuator casing 10. The shaft 65 is provided with a manually operable handle 66 for rotating the shaft and thereby the cam plate 64 so as to move the corresponding end of the yoke member upwardly about its opposite pivot point 56. The lowermost position of the cam plate 64 is shown in FIGURE 1 of the drawings so that the corresponding side of the yoke member 55 is in its lowermost position. The uppermost position of the cam plate 64 is shown in FIGURE 3 of the drawings and it will be seen that the corresponding end of the yoke member 55 has been raised about the pivot point 56 so that the projections or lugs 62 have moved the annular ring 44 upwardly by engagement beneath the surface 47 of the ring. The actual shape of the cam plate 64 is shown in FIGURE 4 of the drawings and it will be seen that the plate has a cam surface 67 which bears against the thrust member 63 on the yoke member 55. In FIGURE 4 of the drawings the cam plate is shown in its inoperative position so that the yoke member is in the lowermost position as shown in FIGURE 1 of the drawings. As the cam plate is rotated clockwise as seen in FIGURE 4 of the drawings the thrust member 63 is moved upwardly. The cam plate 64 is provided with a spring 68 attached to the actuator casing 10 and to a projection 69 on the plate, the spring acting to return the cam plate 64 to its inoperative position as shown in FIGURE 4 when pressure is released on the manually operable lever 66.

The lugs or projections 62 on the yoke member 55 are diametrally positioned and are located at positions intermediate the pivot point 56 and the cam plate 64 so as to provide a mechanical advantage of 2:1 in the operation of the clutch means by the manual lever 66. By providing the yoke member 55 with the single pivot point 56, the yoke member 55 is balanced so that the projections or lugs 62 are equally loaded and the clutch means is lifted absolutely squarely around the output shaft 12 and there is no fear of the clutch means tilting and jamming. The adjustable pivot point 56 for the yoke member 55 permits the final adjustment of the device upon assembly of the parts so that the correct movement can be obtained for the driving blocks 40 and the annular ring 44 so that a correct engagement is always obtained with the driving dogs 51 on the end of the flange 44 of the hand wheel 43.

In order to maintain the clutch means, i.e. the driving blocks 40 and the annular ring 44, in their upper axial position relative to the output shaft 12 a retaining means is provided which is mounted on the yoke member 55. The retaining means comprises a pivoted pawl 70 which is pivotally mounted on the spindle 71 extending through the yoke member 55. A spring 72 mounted on the pin 73 acts to urge the pawl 70 into a vertical position as shown in FIGURES 3 and 6 of the drawings. The arrangement is such that as the yoke member 55 pivots upwardly about its pivot point 56 the pawl 70 is urged by its spring 72 to assume a vertical position and during this movement the lower end 74 of the pawl engages the upper surface of the worm wheel 24 as shown in FIGURE 5 of the drawings. When the driving blocks 40 and the annular ring 44 reach their uppermost position in which the studs 52 are in driving engagement with the dogs 51, the pawl 70 would have reached a substantially vertical position as shown in FIGURE 6 of the drawings so that when pressure is released from the manually operable lever 66 the corresponding end of the yoke member 55 will pivot downwardly to engage the lower end 74 of the pawl 70 firmly in engagement with the top surface of the worm wheel 24 as shown in FIGURES 3 and 6 of the drawings. In this position the pawl 70 maintains the clutch means in its uppermost position so that the hand wheel 43 can be rotated in one or other direction to produce a corresponding rotation of the output shaft 12.

Upon energisation of the electric motor 28 the worm wheel 24 will rotate in one or other direction and the retaining pawl 70 will be pivoted sideways and will thereby permit the spring 53 to move the clutch means, i.e. the driving blocks 40 and the ring 44 downwardly to their lowermost axial position as shown in FIGURE 1 of the drawings. In this position the heads 42 of the studs 41 in the wormwheel 24 will drivably engage the side faces of the driving blocks 40 so as to rotate the output shaft 12 once again by means of the electric motor 28.

The clutch mechanism of the actuator in accordance with the present invention is particularly suitable for relatively large actuators having a high output torque. The construction is robust and relatively simple in operation. Due to the adjustable nature of the yoke member 55 the parts may be suitably adjusted after assembly of the parts within the actuator casing 10.

The actuator is provided with attachment bolts 76 for a lower casing (not shown) around the valve spindle. An outlet section 77 is also provided for the usual electrical terminal blocks for the control of the various electrical circuits of the actuator. The output shaft 12 may be provided with a secondary worm wheel 78 driving an ancillary shaft 79 through the worm wheel 80 for the control of ancillary equipment or switches as desired.

I claim:

1. An actuator, such as a valve actuator, comprising an output shaft or spindle for actuating the valve, a worm wheel mounted on said output shaft or spindle and freely rotatable relatively thereto in response to energisation of a power means such as an electric motor, clutch means mounted on said output shaft or spindle for rotation therewith but movable axially relatively thereto, resilient means normally urging said clutch means in a first axial position in which said worm wheel drivably engages said clutch means, means for moving said clutch means axially against said resilient means into a second axial position on said output shaft or spindle, manual means for drivably engaging said clutch means to rotate said clutch means in said second axial position, and retaining means operable to engage said worm wheel in said second axial position of said clutch means and to hold said clutch means in driving engagement with said manual means, the arrangement being such that subsequent energisation of said power means rotates said worm wheel to disengage said retaining means therefrom whereby said clutch means is moved from its second axial position to its first axial position by said resilient means for drivably re-engaging said worm wheel.

2. An actuator as claimed in claim 1, in which the output shaft or spindle is formed with a pair of diametrally positioned slots in its outer surface and which extend axially of the shaft or spindle to slidably receive a pair of blocks or like members forming said clutch means.

3. An actuator as claimed in claim 2, in which the blocks or like members engage the worm wheel in the first axial position of the clutch means and said worm wheel is formed with a pair of upstanding projections or lugs for drivably engaging the side faces of said blocks or like members upon rotation of said worm wheel by said power means.

4. An actuator as claimed in claim 2, in which an annular ring is secured to said blocks or like members for movement therewith, said ring drivably engaging said manual means in said second axial position of said clutch means.

5. An actuator as claimed in claim 4, in which said clutch means is moved axially to its second axial position by a yoke member mounted around said output shaft or spindle and engaging beneath said annular ring, said yoke member being pivotally mounted at one side of said output shaft or spindle for pivotal movement by a manually operable cam member positioned at the opposite side of said output shaft or spindle.

6. An actuator as claimed in claim 5, wherein the cam member is movable to engage a thrust member on said yoke member by means of a manually operable lever.

7. An actuator as claimed in claim 6, wherein said cam member is urged by resilient means to an inoperative position.

8. An actuator as claimed in claim 7, wherein the yoke member is formed with a pair of inwardly directed projections or lugs engaging beneath said annular ring of the clutch means.

9. An actuator as claimed in claim 8, in which the pivotal mounting of the yoke member is adjustable.

10. An actuator as claimed in claim 8, wherein the retaining means comprises a pawl pivotally mounted on said yoke member and urged by resilient means to a vertical position to engage the end of the pawl with the upper surface of the worm wheel in the second axial position of the clutch means.

References Cited by the Examiner

UNITED STATES PATENTS

| | | | |
|---|---|---|---|
| 2,028,696 | 1/1936 | Beckwith | 74—626 |
| 2,621,544 | 12/1952 | Rossmann | 74—626 |
| 2,861,473 | 11/1958 | Allnaan et al. | 74—625 |

BROUGHTON G. DURHAM, *Primary Examiner.*

WESLEY S. RATLIFF, JR., *Examiner.*